United States Patent
Park et al.

(10) Patent No.: US 12,392,740 B2
(45) Date of Patent: Aug. 19, 2025

(54) XPS SAMPLE HOLDER, APPARATUS FOR X-RAY PHOTOELECTRON SPECTROSCOPY INCLUDING THE SAME AND METHOD FOR X-RAY PHOTOELECTRON SPECTROSCOPY USING THE SAME

(71) Applicant: KOREA INSTITUTE OF SCIENCE AND TECHNOLOGY, Seoul (KR)

(72) Inventors: Soohyung Park, Seoul (KR); NamHee Kwon, Seoul (KR); Habin Kang, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 188 days.

(21) Appl. No.: 18/341,606

(22) Filed: Jun. 26, 2023

(65) Prior Publication Data

US 2024/0125716 A1  Apr. 18, 2024

(30) Foreign Application Priority Data

Oct. 13, 2022 (KR) .................. 10-2022-0131318

(51) Int. Cl.
*G01N 23/2204* (2018.01)
*G01N 23/2273* (2018.01)

(52) U.S. Cl.
CPC ..... *G01N 23/2204* (2013.01); *G01N 23/2273* (2013.01)

(58) Field of Classification Search
CPC .................................................. G01N 23/2273
See application file for complete search history.

(56) References Cited

FOREIGN PATENT DOCUMENTS

| CN | 110133026 A | | 8/2019 | |
|---|---|---|---|---|
| CN | 110133026 B | * | 9/2020 | ......... G01N 23/2204 |
| JP | 2002189006 A | | 7/2002 | |
| JP | 2008258076 A | * | 10/2008 | |
| KR | 10-2016-0143356 A | | 12/2016 | |
| KR | 10-2017-0140659 A | | 12/2017 | |
| KR | 10-2018-0064112 A | | 6/2018 | |
| KR | 10-2022-0091171 A | | 6/2022 | |

OTHER PUBLICATIONS

A. Benayad et al., "Operando XPS: A Novel Approach for Probing the Lithium/Electrolyte Interphase Dynamic Evolution", The Journal of Physical Chemistry A, 2021, pp. 1069-1081, 125, 4.

D. Weingarth et al., "In situ electrochemical XPS study of the Pt/[EMIM][BF4] system", Electrochemistry Communications, Jun. 2011, pp. 619-622, vol. 13, Issue 6.

* cited by examiner

*Primary Examiner* — David J Makiya
*Assistant Examiner* — Miya Downing

(57) ABSTRACT

Provided is an XPS sample holder including: a holder body configured to provide an inner space; a first voltage transmitting member that passes through a top surface of the holder body in a vertical direction; a second voltage transmitting member that passes through the top surface of the holder body in the vertical direction and is spaced apart from the first voltage transmitting member in a first direction that is a horizontal direction; an inner connection member disposed in the holder body and electrically connected to the first voltage transmitting member; a first electrode part disposed on the top surface of the holder body and connected to the first voltage transmitting member; and a second electrode part disposed on the top surface of the holder body and connected to the second voltage transmitting member.

20 Claims, 11 Drawing Sheets

XPS SAMPLE HOLDER, APPARATUS FOR X-RAY PHOTOELECTRON SPECTROSCOPY INCLUDING THE SAME AND METHOD FOR X-RAY PHOTOELECTRON SPECTROSCOPY USING THE SAME

CROSS-REFERENCE TO RELATED APPLICATIONS

This U.S. non-provisional patent application claims priority under 35 U.S.C. § 119 of Korean Patent Application No. 10-2022-0131318, filed on Oct. 13, 2022, the entire contents of which are hereby incorporated by reference.

BACKGROUND

The present disclosure herein relates to an XPS sample holder, an apparatus for X-ray photoelectron spectroscopy including the same, and a method for X-ray photoelectron spectroscopy using the same, and more particularly, to an XPS sample holder capable of performing a spectroscopy measurement in a state in which a voltage is applied to a sample, an apparatus for X-ray photoelectron spectroscopy including the same, and a method for X-ray photoelectron spectroscopy using the same.

X-ray photoelectron spectroscopy (XPS) may analyze a sample using a photoelectric effect. To this end, an apparatus for XPS may include an X-ray irradiation device. The X-ray irradiation device may irradiate a sample disposed on a holder with X-rays. When irradiated with the X-rays, photoelectrons may be emitted from the sample. Elements of the sample may be analyzed by detecting the photoelectrons emitted from the sample.

SUMMARY

The present disclosure provides an XPS sample holder capable of analyzing a sample under a voltage applied environment, an apparatus for X-ray photoelectron spectroscopy including the same, and a method for X-ray photoelectron spectroscopy using the same.

The present disclosure also provides an XPS sample holder capable of preventing distortion of measurement results caused by an electric field, an apparatus for X-ray photoelectron spectroscopy including the same, and a method for X-ray photoelectron spectroscopy using the same.

The present disclosure also provides an XPS sample holder capable of providing a symmetric electric field, an apparatus for X-ray photoelectron spectroscopy including the same, and a method for X-ray photoelectron spectroscopy using the same.

The object of the present invention is not limited to the aforesaid, but other objects not described herein will be clearly understood by those skilled in the art from descriptions below.

An embodiment of the inventive concept provides an XPS sample holder including: a holder body configured to provide an inner space; a first voltage transmitting member that passes through a top surface of the holder body in a vertical direction; a second voltage transmitting member that passes through the top surface of the holder body in the vertical direction and is spaced apart from the first voltage transmitting member in a first direction that is a horizontal direction; an inner connection member disposed in the holder body and electrically connected to the first voltage transmitting member; a first electrode part disposed on the top surface of the holder body and connected to the first voltage transmitting member; and a second electrode part disposed on the top surface of the holder body and connected to the second voltage transmitting member. Here, the first electrode part and the second electrode part are spaced apart from each other in the first direction.

In an embodiment, the holder body may be electrically grounded.

In an embodiment, the inner connection member may pass an axis of the holder body parallel to a second direction that is a vertical direction and have a shape symmetric based on a cross-section parallel to the first direction.

In an embodiment, the inner connection member may include: an inner connection plate spreading in the horizontal direction; and an inner connection axis extending downward from the inner connection plate. Here, the inner connection axis may be disposed on the axis of the holder body, and the first voltage transmitting member may be electrically connected to the inner connection plate.

In an embodiment, the XPS sample holder may further include an insulation plate disposed between the inner connection member and the holder body.

In an embodiment, the holder body may include: an upper plate having the top surface; and a support member extending downward from the upper plate and surrounding the inner space at a side surface thereof.

In an embodiment, the first electrode part may include: a first transmitting part having one end connected to the first voltage transmitting member and extending in the first direction; a first connection part extending from the other end of the first transmitting part in a horizontal direction crossing the first direction; and a plurality of first contact parts each extending from the first connection part in the first direction, and the second electrode part may include: a second transmitting part having one end connected to the second voltage transmitting member and extending in the first direction; a second connection part extending from the other end of the second transmitting part in the horizontal direction crossing the first direction; and a plurality of second contact parts each extending from the second connection part in a direction opposite to the first direction. Here, each of the plurality of first contact parts may be arranged alternately with each of the plurality of second contact parts in the horizontal direction.

In an embodiment, each of the first voltage transmitting member and the second voltage transmitting member may have a screw shape.

In an embodiment of the inventive concept, an apparatus for X-ray photoelectron spectroscopy includes: an XPS sample holder; and an X-ray irradiation device configured to irradiate a sample on the XPS sample holder with X-rays. Here, the XPS sample holder includes: a holder body; a first voltage transmitting member that passes through a top surface of the holder body in a vertical direction; a second voltage transmitting member that passes through the top surface of the holder body in the vertical direction and is spaced apart from the first voltage transmitting member; an inner connection member electrically connected to the first voltage transmitting member; a first electrode part disposed on the top surface of the holder body and connected to the first voltage transmitting member; and a second electrode part disposed on the top surface of the holder body and connected to the second voltage transmitting member. Also, the inner connection member includes: an inner connection plate spreading in a horizontal direction; and an inner connection axis extending downward from the inner connection plate, and the inner connection axis is disposed on an axis of the holder body.

In an embodiment, the second voltage transmitting member may be electrically connected to the holder body, and the first voltage transmitting member may be electrically connected to the inner connection plate.

In an embodiment, the holder body may include: an upper plate having the top surface; and a support member extending downward from the upper plate to define an inner space, and the inner connection member may be disposed in the inner space.

In an embodiment, the XPS sample holder may further include an insulation plate disposed between the inner connection member and the holder body.

In an embodiment, the insulation plate may be disposed in the inner space.

In an embodiment, each of the first voltage transmitting member and the second voltage transmitting member may have a screw shape.

In an embodiment, the apparatus may further include a detector configured to detect photoelectrons emitted from the sample on the XPS sample holder.

In an embodiment of the inventive concept, a method for X-ray photoelectron spectroscopy includes: arranging a sample onto an XPS sample holder; applying a voltage to the sample by using the XPS sample holder; and irradiating the sample with X-rays, and the XPS sample holder includes: a holder body; a first voltage transmitting member that passes through a top surface of the holder body in a vertical direction; a second voltage transmitting member that passes through the top surface of the holder body in the vertical direction and is spaced apart from the first voltage transmitting member; an inner connection member electrically connected to the first voltage transmitting member; a first electrode part disposed on the top surface of the holder body and connected to the first voltage transmitting member; and a second electrode part disposed on the top surface of the holder body and connected to the second voltage transmitting member. Here, the arranging of the sample onto the XPS sample holder includes arranging the sample onto the first electrode part and the second electrode part.

In an embodiment, the applying of the voltage to the sample may be performed by the first electrode part and the second electrode part.

In an embodiment, the second voltage transmitting member may be electrically connected to the holder body.

In an embodiment, the inner connection member may include: an inner connection plate spreading in a horizontal direction; and an inner connection axis extending downward from the inner connection plate, and the inner connection axis may be disposed on an axis of the holder body.

In an embodiment, the method of claim may further include detecting photoelectrons emitted from the sample on the XPS sample holder.

Particularities of other embodiments are included in the detailed description and drawings.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
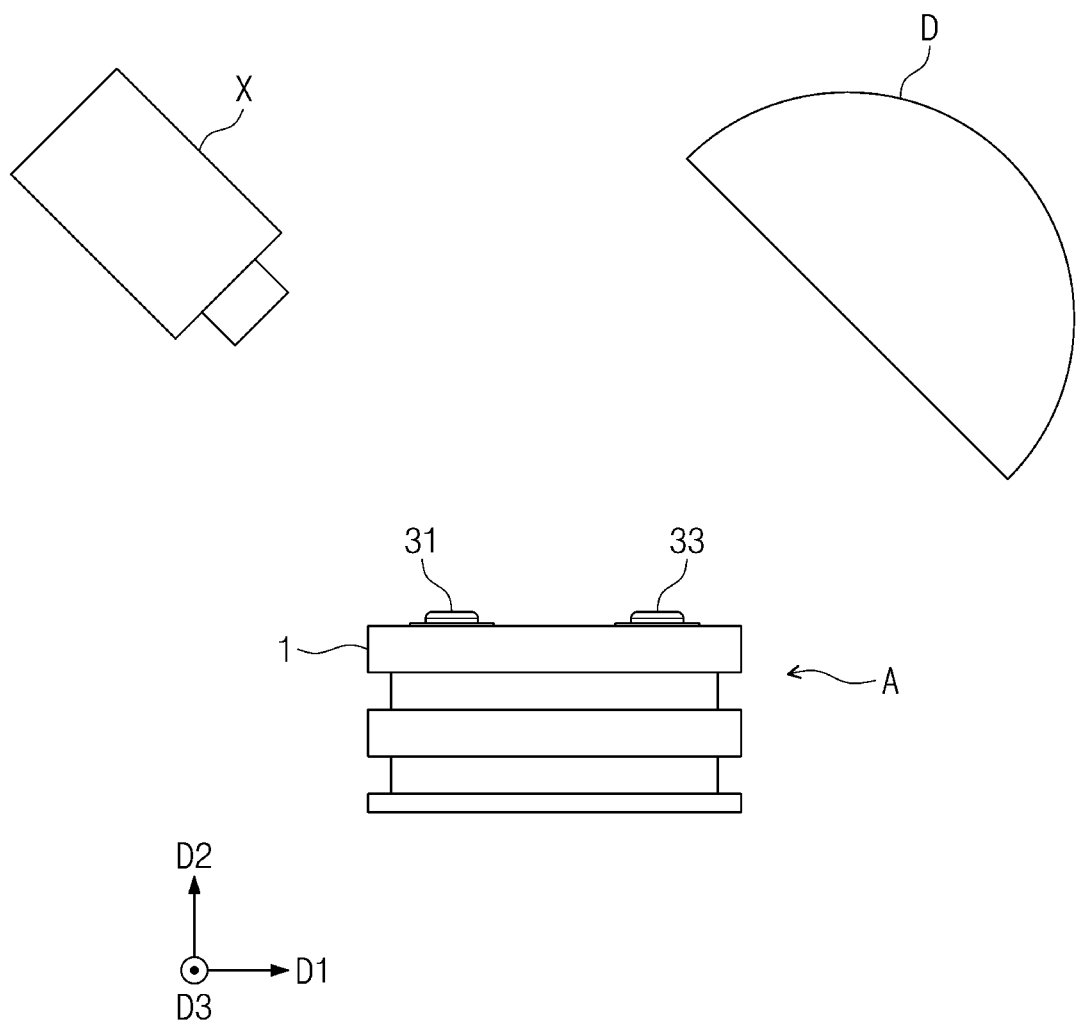
FIG. 1 is a schematic view illustrating an apparatus for X-ray photoelectron spectroscopy according to embodiments of the inventive concept.

Preferred embodiments of the inventive concept will be described with reference to the accompanying drawings so as to sufficiently understand constitutions and effects of embodiments of the inventive concept. The technical ideas of the inventive concept may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

Like reference numerals refer to like elements throughout. The embodiment in the detailed description will be described with cross-sectional views and/or plan views as ideal exemplary views of the inventive concept. Also, in the figures, the dimensions of layers and regions are exaggerated for clarity of illustration. Areas exemplified in the drawings have general properties, and are used to illustrate a specific shape of a semiconductor package region. Thus, this should not be construed as limited to the scope of the present invention. Also, although various terms are used to describe various components in various embodiments of the inventive concept, the component are not limited to these terms. These terms are only used to distinguish one component from another component. Embodiments described and exemplified herein include complementary embodiments thereof.

In the specification, the technical terms are used only for explaining a specific exemplary embodiment while not limiting the present invention. In the specification, the terms of a singular form may include plural forms unless referred to the contrary. Also, the meaning of "include," "comprise," "including," or "comprising," specifies a property, a region, a fixed number, a step, a process, an element and/or a component but does not exclude other properties, regions, fixed numbers, steps, processes, elements and/or components.

Hereinafter, preferred embodiments of the inventive concept will be described in detail with reference to the attached drawings.

FIG. 1 is a schematic view illustrating an apparatus for X-ray photoelectron spectroscopy according to embodiments of the inventive concept.

Hereinafter, D1 may be referred to as a first direction, D2 crossing the first direction D1 may be referred to as a second direction, and D3 crossing each of the first direction D1 and the second direction D2 may be referred to as a third direction. Each of the first direction D1 and the second direction D2 may be referred to as a horizontal direction. Also, the second direction D2 may be referred to as a vertical direction.

Referring to FIG. 1, an apparatus for X-ray photoelectron spectroscopy (hereinafter, referred to as an X-ray photoelectron spectroscopy apparatus) may be provided. The X-ray photoelectron spectroscopy apparatus may analyze a sample by using a photoelectric effect. More specifically, the X-ray photoelectron spectroscopy apparatus may irradiate a sample with X-rays to detect photoelectrons emitted from the sample. To this end, the X-ray photoelectron spectroscopy apparatus may include an XPS sample holder A, an X-ray irradiation device X, and a detector D.

The XPS sample holder A may support the sample. That is, a method for X-ray photoelectron spectroscopy (hereinafter, referred to as an X-ray photoelectron spectroscopy method) may be implemented in a state in which the sample is disposed on the XPS sample holder A. The XPS sample holder A may apply a voltage to the sample. Thus, the sample may be analyzed under a voltage applied environment. To this end, the XPS sample holder A may include a holder body 1, a first voltage transmitting member 31, and a second voltage transmitting member 33. The holder body 1 may support the sample. The first voltage transmitting member 31 and the second voltage transmitting member 33 may apply a voltage to the sample. A detailed description thereof will be described later.

The X-ray irradiation device X may be disposed above the XPS sample holder A. For example, the X-ray irradiation device X may be spaced upward from the XPS sample holder A. The X-ray irradiation device X may irradiate the XPS sample holder A with X-rays. More specifically, the X-ray irradiation device X may irradiate the sample disposed on the XPS sample holder A with X-rays. To this end, the X-ray irradiation device X may include various configurations capable of generating and irradiating the X-rays.

The detector D may be disposed above the XPS sample holder A. For example, the detector D may be spaced upward from the XPS sample holder A. The detector D may be spaced apart from the X-ray irradiation device X in the horizontal direction. The detector D may detect electrons emitted from the sample. More specifically, the detector D may detect photoelectrons emitted from the sample irradiated with the X-rays. The detector D may obtain elements of the sample by analyzing information of the photoelectrons detected by the detector D. To this end, the detector D may be connected to a separate control unit such as a computer.

Figure 2:
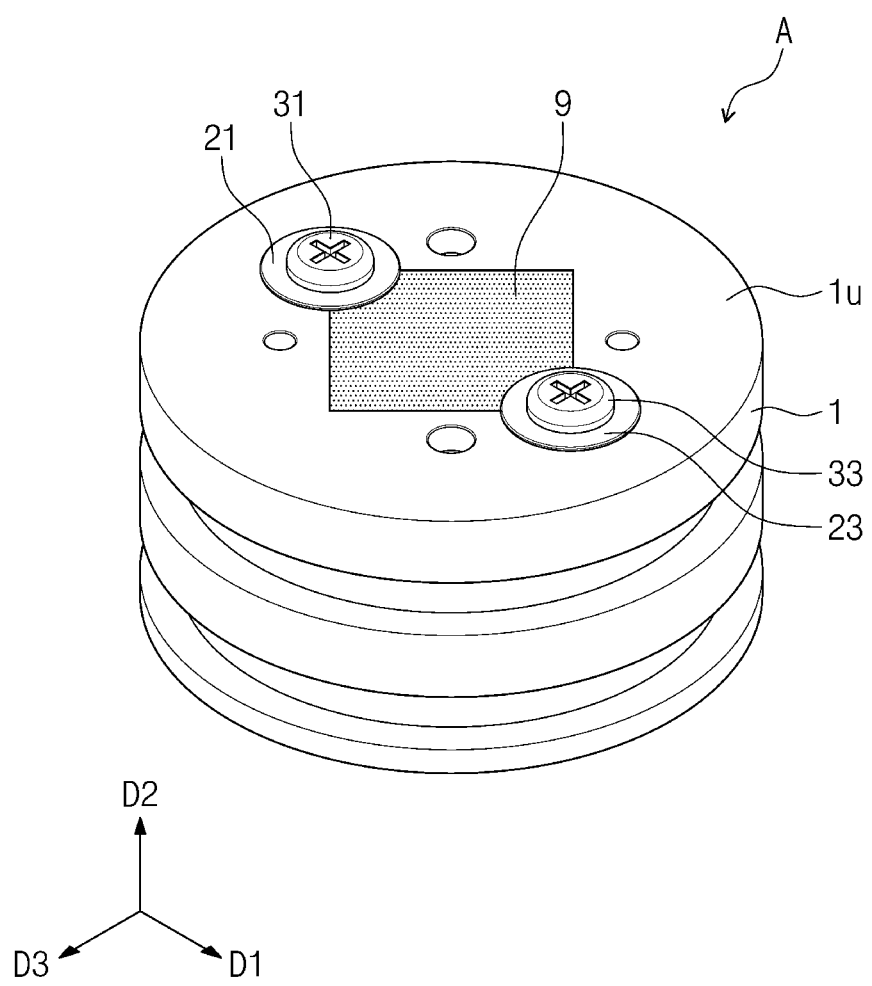
FIG. 2 is a perspective view illustrating a XPS sample holder according to embodiments of the inventive concept.
Figure 3:
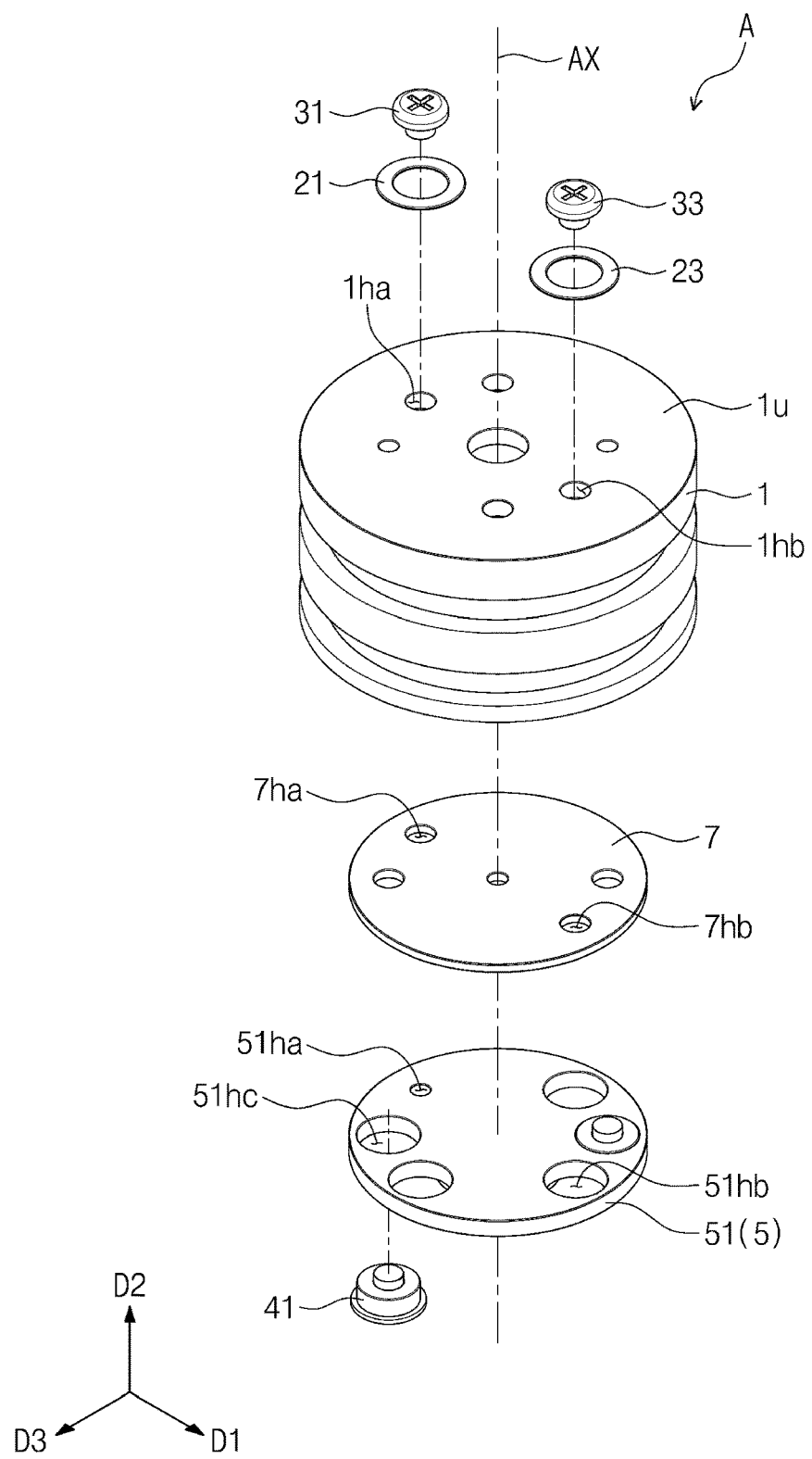
FIG. 3 is an exploded perspective view illustrating the XPS sample holder according to embodiments of the inventive concept.
Figure 4:
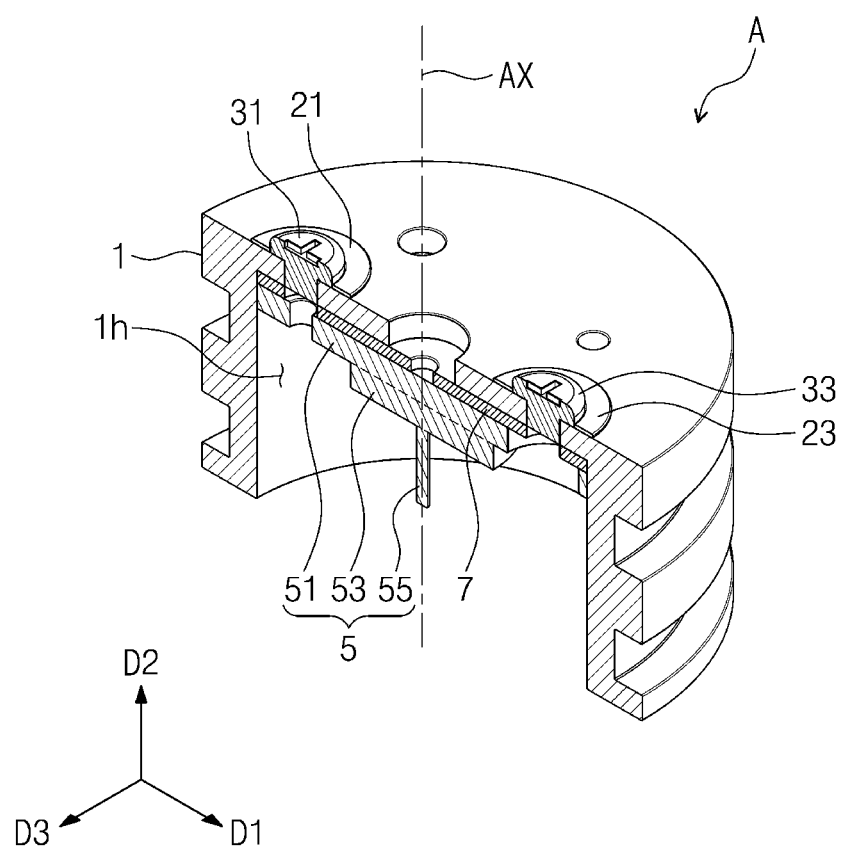
FIG. 4 is a partially-cut perspective view illustrating the XPS sample holder according to embodiments of the inventive concept.
Figure 5:
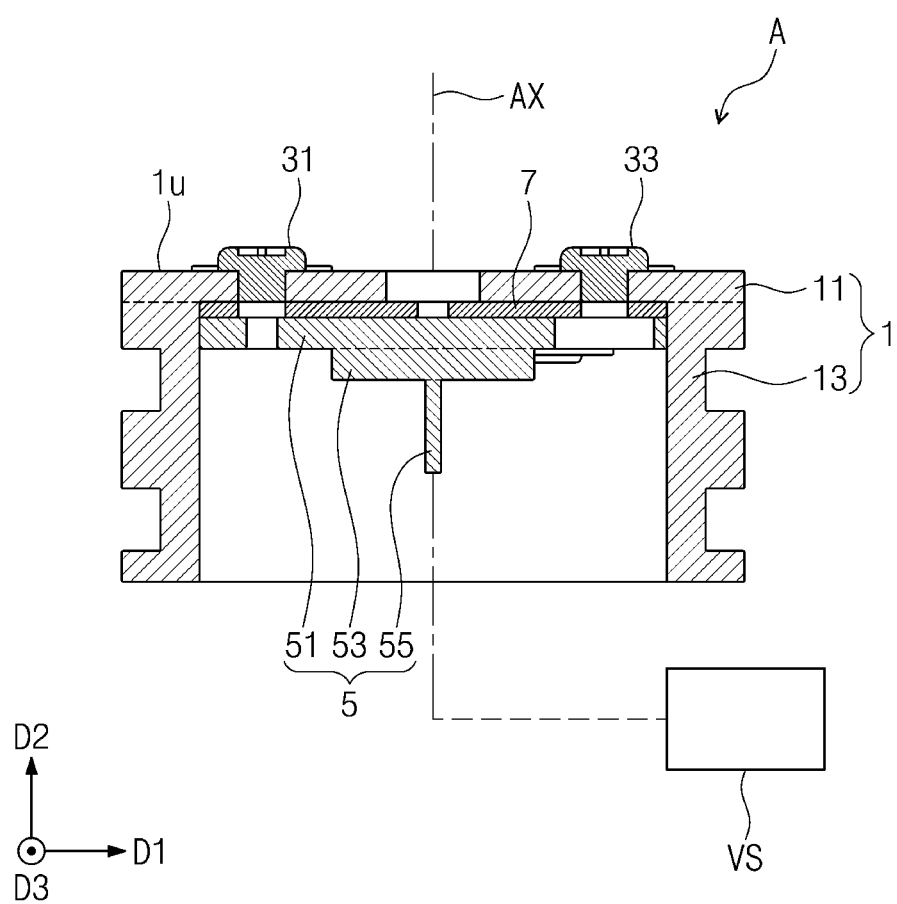
FIG. 5 is a cross-sectional view illustrating the XPS sample holder according to embodiments of the inventive concept.

FIG. 2 is a perspective view illustrating the XPS sample holder according to the embodiments of the inventive concept, FIG. 3 is an exploded perspective view illustrating the XPS sample holder according to the embodiments of the inventive concept, FIG. 4 is a partially-cut perspective view illustrating the XPS sample holder according to the embodiments of the inventive concept, and FIG. 5 is a cross-sectional view illustrating the XPS sample holder according to the embodiments of the inventive concept.

Referring to FIGS. 2 to 5, the XPS sample holder A may include the holder body 1, the first voltage transmitting member 31, the second voltage transmitting member 33, a first ring 21, a second ring 23, an inner connection member 5, an insulation plate 7, and a voltage applying part 9.

The holder body 1 may provide an inner space 1h. The inner connection member 5 or the like may be disposed in the inner space 1h of the holder body 1. The holder body 1 may include a conductive material. For example, the holder body 1 may include metal. The holder body 1 may be electrically grounded. The holder body 1 may have an axis AX parallel to the second direction D2. The holder body 1 may include an upper plate 11 and a support member 13. The upper plate 11 may spread in the horizontal direction. The upper plate 11 may have a circular plate shape. The sample may be disposed on a top surface 1u of the upper plate 11. The upper plate 11 may have a first upper hole 1ha and a second upper hole 1hb. A portion of the first voltage transmitting member 31 may be inserted into the first upper hole 1ha. A portion of the second voltage transmitting member 33 may be inserted into the second upper hole 1hb. The support member 13 may extend downward from the upper plate 11. The support member 13 may have a hollow cylindrical shape. More specifically, the support member 13 may have a shape of a rotating body that rotates around an axis AX. The inner space 1h may be defined by an inner surface of the support member 13. More specifically, the inner space 1h may be defined by the inner surface of the support member 13 and a bottom surface of the upper plate 11.

The first voltage transmitting member 31 may pass through the top surface 1u of the holder body 1 in the vertical direction. A portion of the first voltage transmitting member 31 may be disposed on the top surface 1u of the holder body 1. As the first voltage transmitting member 31 passes through the upper plate 11 in the vertical direction, a portion of the first voltage transmitting member 31 may be disposed in the inner space 1h. The first voltage transmitting member 31 may be electrically connected to the inner connection member 5. For example, a bottom surface of the first voltage transmitting member 31 may contact the inner connection member 5. Alternatively, as the first voltage transmitting member 31 is inserted to the inner connection member 5, the first voltage transmitting member 31 may contact the inner connection member 5. Alternatively, as the first voltage transmitting member 31 is inserted to the inner connection member 5, the first voltage transmitting member 31 may contact the inner connection member 5. The first voltage transmitting member 31 may be electrically insulated from the holder body 1. To this end, the first voltage transmitting member 31 may not contact the holder body 1. Alternatively, the first voltage transmitting member 31 may be covered by an insulating material in a portion in which the first voltage transmitting member 31 contacts the holder body 1. Although the first voltage transmitting member 31 may have a screw shape, the embodiment of the inventive concept is not limited thereto.

The second voltage transmitting member 33 may be spaced apart from the first voltage transmitting member 31 in the horizontal direction. For example, the second voltage transmitting member 33 may be spaced apart from the first voltage transmitting member 31 in the first direction D1. The second voltage transmitting member 33 may pass through the top surface 1u of the holder body 1 in the vertical direction. A portion of the second voltage transmitting member 33 may be disposed on the top surface 1u of the holder body 1. As the second voltage transmitting member 33 passes through the upper plate 11 in the vertical direction, a portion of the second voltage transmitting member 33 may be disposed in the inner space 1h. The second voltage transmitting member 33 may be electrically connected to the holder body 1. For example, a side surface of the second voltage transmitting member 33 may contact the holder body 1. The second voltage transmitting member 33 may be electrically insulated from the inner connection member 5. To this end, the second voltage transmitting member 33 may not contact the inner connection member 5. Alternatively, the second voltage transmitting member 33 may be covered by an insulating material in a portion in which the second voltage transmitting member 33 contacts the inner connection member 5. Since the second voltage transmitting member 33 is not electrically connected to the inner connection member 5, the second voltage transmitting member 33 may not be electrically connected to the first voltage transmitting member 31. Although the second voltage transmitting member 33 may have a screw shape, the embodiment of the inventive concept is not limited thereto.

The first ring 21 may be disposed on the top surface 1*u* of the holder body 1. The first ring 21 may be connected to the first voltage transmitting member 31. The first ring 21 may include a conductive material. The first voltage transmitting member 31 may be electrically connected to a portion of the voltage applying part 9 by the first ring 21.

The second ring 23 may be disposed on the top surface 1*u* of the holder body 1. The second ring 23 may be connected to the second voltage transmitting member 33. The second ring 23 may include a conductive material. The second voltage transmitting member 33 may be electrically connected to another portion of the voltage applying part 9 by the second ring 23.

The inner connection member 5 may be disposed in the holder body 1. More specifically, the inner connection member 5 may be disposed in the inner space 1*h*. The inner connection member 5 may include a conductive material. For example, the inner connection member 5 may include metal. The inner connection member 5 may have a symmetric shape. More specifically, the inner connection member 5 may have a shape symmetric with respect to a cross-section passing the axis AX and parallel to the second direction D2. The inner connection member 5 may include an inner connection plate 51, a lower plate 53, and an inner connection axis 55.

The inner connection plate 51 may spread in the horizontal direction. The inner connection plate 51 may have a circular plate shape. The inner connection plate 51 may be electrically connected to the first voltage transmitting member 31. The inner connection plate 51 may have a first hole 51*ha*, a second hole 51*hb*, and a third hole 51*hc*. The first hole 51*ha* may be disposed below the first voltage transmitting member 31. The first voltage transmitting member 31 and the inner connection plate 51 may contact each other on the first hole 51*ha*. The first hole 51*ha* may have a diameter less than that of the first voltage transmitting member 31. However, the embodiment of the inventive concept is not limited thereto. That is, the first voltage transmitting member 31 may be inserted to the first hole 51*ha*. The second hole 51*hb* may be disposed below the second voltage transmitting member 33. The second hole 51*hb* may have a diameter greater than that of the second voltage transmitting member 33. That is, the second voltage transmitting member 33 may be inserted to the second hole 51*hb*. Although the second voltage transmitting member 33 is inserted to the second hole 51*hb* because the second hole 51*hb* has the diameter greater than that of the second voltage transmitting member 33, the second voltage transmitting member 33 and the inner connection plate 51 may not contact each other. However, the embodiment of the inventive concept is not limited thereto. For example, the second voltage transmitting member 33 may not be inserted to the second hole 51*hb*. A coupling member 41 may be inserted to the third hole 51*hc*. The inner connection member 5, the insulation plate 7, and the holder body 1 may be coupled to each other by the coupling member 41. The third hole 51*hc* may be provided in plurality. A plurality of third holes 51*hc* may be spaced apart from each other in a circumferential direction.

The lower plate 53 may be coupled to a bottom surface of the inner connection plate 51. The lower plate 53 may have a circular plate shape.

The inner connection axis 55 may extend downward from the inner connection plate 51. More specifically, the inner connection axis 55 may extend downward from a bottom surface of the lower plate 53. The inner connection axis 55 may be disposed on the axis AX.

Although the inner connection plate 51, the lower plate 53, and the inner connection axis 55 may be integrated with each other, the embodiment of the inventive concept is not limited thereto.

The inner connection member 5 may be connected to a voltage supply unit VS. For example, the inner connection axis 55 may be electrically connected to the voltage supply unit VS. A voltage supplied from the voltage supply unit VS may be transmitted to the voltage applying part 9 through the inner connection member 5 and the first transmitting member 31.

The insulation plate 7 may be disposed between the inner connection member and the holder body 1. The insulation plate 7 may be disposed on a bottom surface of the upper plate 11. The insulation plate 7 may include an insulating material. For example, the insulation plate 7 may include ceramic. The holder body 1 and the inner connection member 5 may be electrically insulated from each other by the insulation plate 7. The insulation plate 7 may have a circular plate shape. The insulation plate 7 may have a first insulation hole 7*ha* and a second insulation hole 7*hb*. The first insulation hole 7*ha* may be disposed on the first hole 51*ha*. The first voltage transmission member 31 may be electrically connected to the inner connection member 51 through the first insulation hole 7*ha*. The second insulation hole 7*hb* may be disposed on the second hole 51*hb*.

The voltage applying part 9 may be disposed on the holder body 1. More specifically, the voltage applying part 9 may be disposed on the top surface 1*u* of the holder body 1. A portion of the voltage applying part 9 may be electrically connected to the first voltage transmitting member 31. Another portion of the voltage applying part 9 may be electrically connected to the second voltage transmitting member 33. The sample may be disposed on the voltage applying part 9. A detailed description of the voltage applying part 9 will be described later with reference to FIG. 6.

Figure 6:
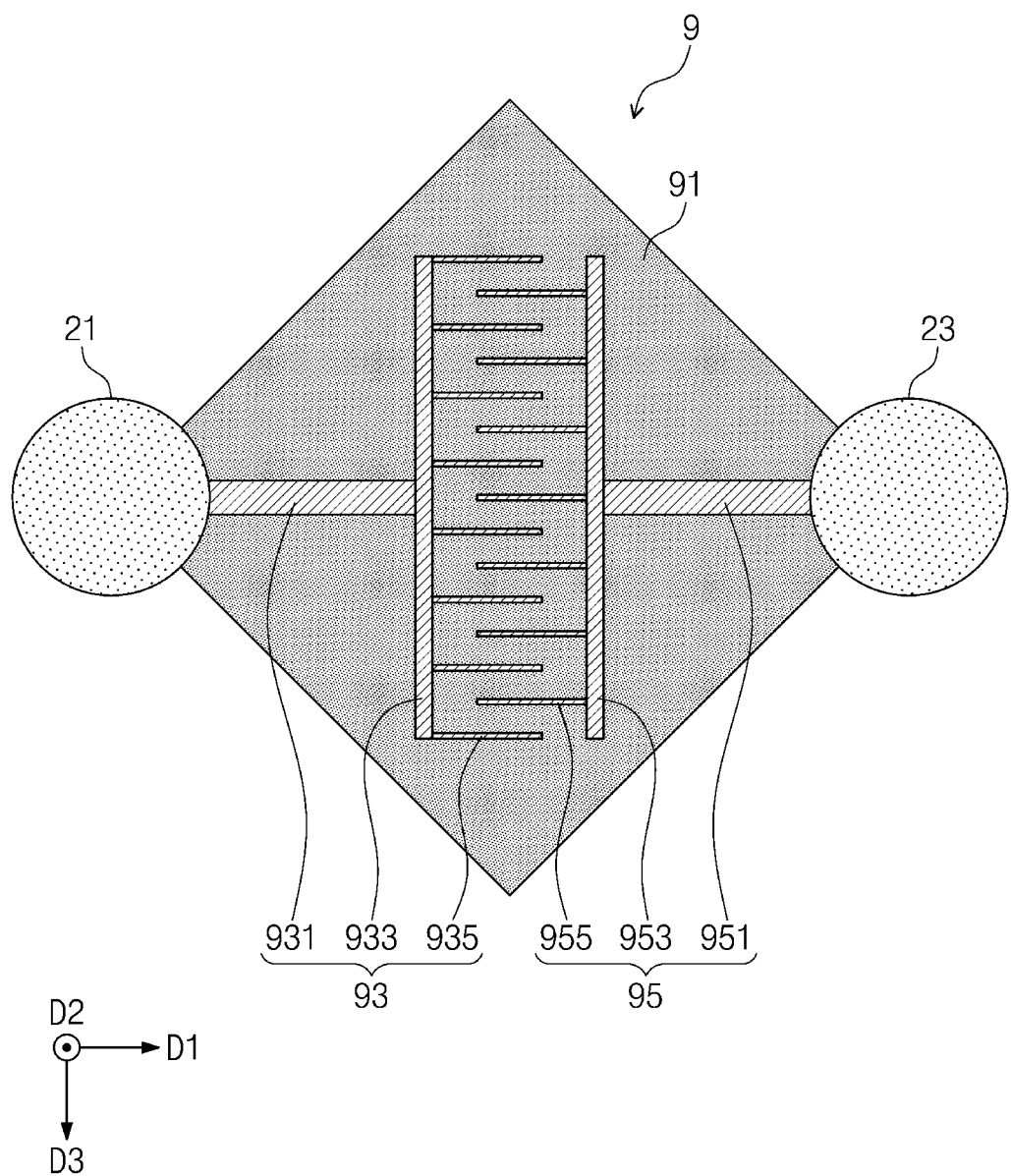
FIG. 6 is a plan view illustrating a portion of the XPS sample holder according to embodiments of the inventive concept.

FIG. 6 is a plan view illustrating a portion of the XPS sample holder according to embodiments of the inventive concept.

Referring to FIG. 6, the voltage applying part 9 may include a base plate 91, a first electrode part 93, and a second electrode part 95.

The base plate 91 may be disposed on the top surface 1*u* of the holder body 1 (refer to FIG. 2). The base plate 91 may include an insulating material. The first electrode part 93 may be disposed on the base plate 91. The first electrode part 93 may be electrically connected to the first voltage transmitting member 31 (refer to FIG. 2). For example, the first electrode part 93 may be electrically connected to the first voltage transmitting member 31 through the first ring 21. The first electrode part 93 may include a conductive material. For example, the first electrode part 93 may include metal. The first electrode part 93 may include a first transmitting part 931, a first connection part 933, and a first contact part 935. The first transmitting part 931 may have one end connected to the first voltage transmitting member 31. The first transmitting part 931 may extend in the first direction D1. The first connection part 933 may extend from the other end of the first transmitting part 931 in the third direction D3. The first contact part 935 may extend from the first connection part 933 in the first direction D1. The first contact part 935 may be provided in plurality. A plurality of first contact parts 935 may be spaced apart from each other in the third direction D3.

The second electrode part 95 may be disposed on the base plate 91. The second electrode part 95 may be electrically connected to the second voltage transmitting member 33 (refer to FIG. 2). For example, the second electrode part 95 may be electrically connected to the second voltage transmitting member 33 through the second ring 23. The second electrode part 95 may include a conductive material. For example, the second electrode part 95 may include metal. The second electrode part 95 may include a second transmitting part 951, a second connection part 953, and a second contact part 955. The second transmitting part 951 may have one end connected to the first voltage transmitting member 33. The second transmitting part 951 may extend in the first direction D1. The second connection part 953 may extend from the other end of the second transmitting part 931 in the third direction D3. The second contact part 955 may extend from the second connection part 953 in the first direction D1. The second contact part 955 may be provided in plurality. A plurality of second contact parts 955 may be spaced apart from each other in the third direction D3. As illustrated in FIG. 6, the plurality of first contact parts 935 and the plurality of second contact parts 955 may be arranged alternately with each other in the third direction D3. Each of the plurality of first contact parts 935 may be spaced apart from each of the plurality of second contact parts 955. Thus, each of the plurality of first contact parts 935 may be electrically insulated from each of the plurality of second contact parts 955.

Figure 7:
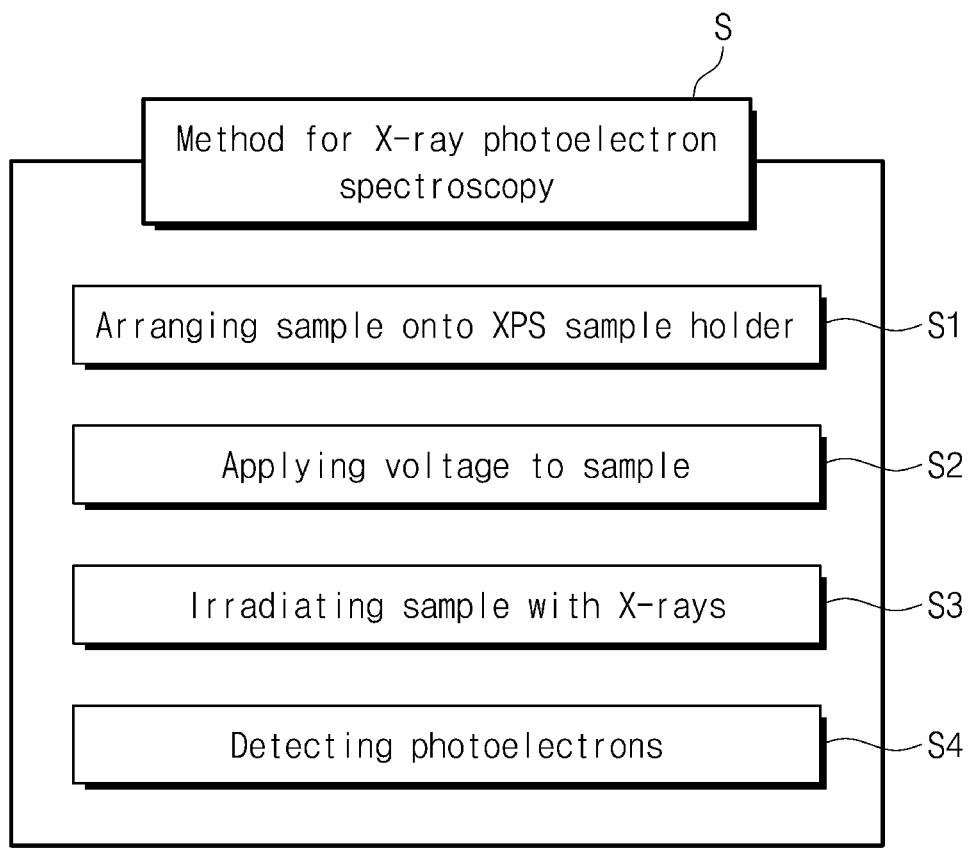
FIG. 7 is a flowchart representing a method for X-ray photoelectron spectroscopy according to embodiments of the inventive concept.
Figure 8:
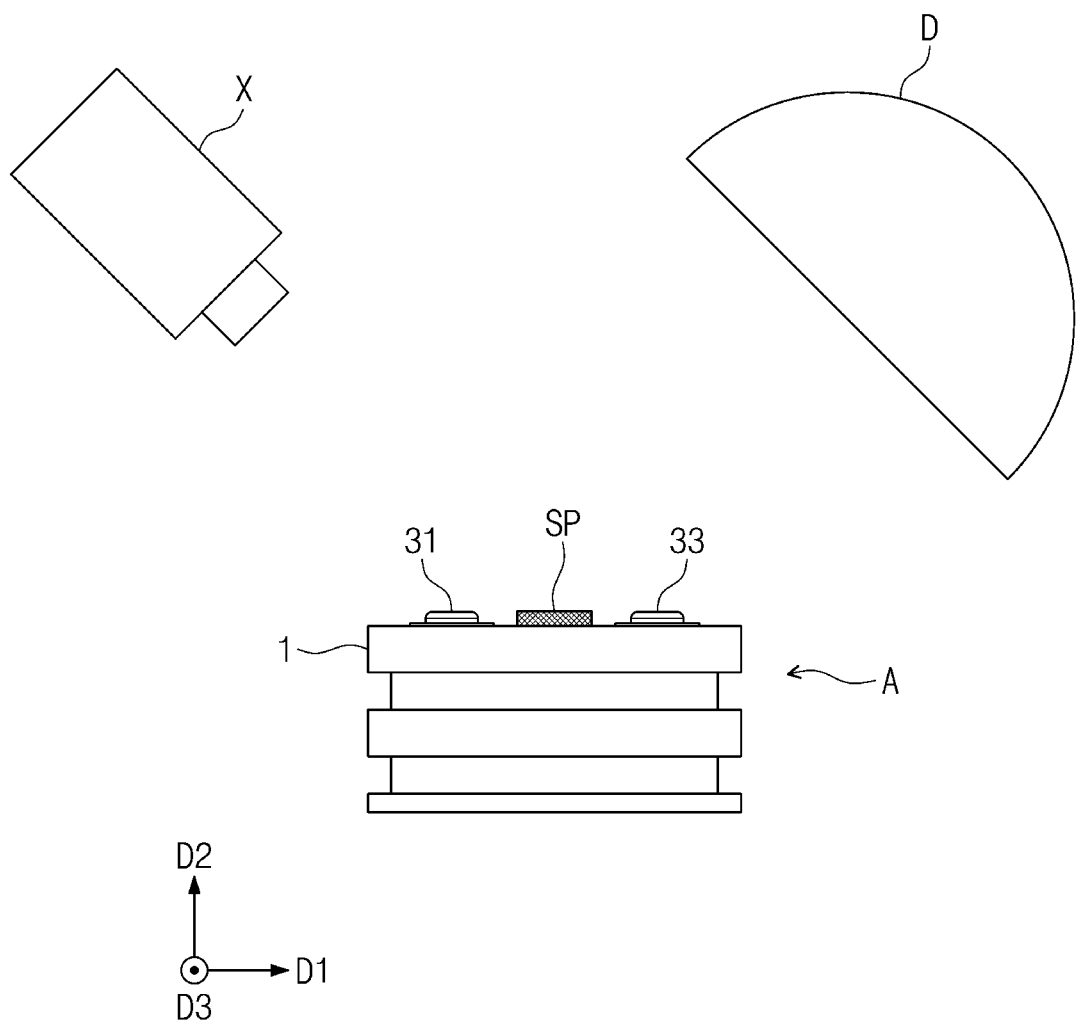
FIG. 8, FIG. 9, FIG. 10, and FIG. 11 are views sequentially illustrating the method for X-ray photoelectron spectroscopy according to the flowchart in FIG. 7.

FIG. 7 is a flowchart representing a method for X-ray photoelectron spectroscopy according to embodiments of the inventive concept.

Referring to FIG. 7, a method S for X-ray photoelectron spectroscopy (hereinafter, referred to as an X-ray photoelectron spectroscopy method S) may be provided. The X-ray photoelectron spectroscopy method S may be a method for analyzing a sample by using the X-ray photoelectron spectroscopy apparatus described with reference to FIGS. 1 to 6. The X-ray photoelectron spectroscopy method S may include a process 51 of arranging a sample onto an XPS sample holder, a process S2 of applying a voltage to the sample, a process S3 of irradiating the sample with X-rays, and a process S4 of detecting photoelectrons.

Hereinafter, the X-ray photoelectron spectroscopy method S will be described in detail with reference to FIGS. 8 to 11.

FIGS. 8 to 11 are views sequentially illustrating the X-ray photoelectron spectroscopy method according to the flowchart in FIG. 7.

Referring to FIGS. 8, 9, 10, and 7, the process 51 of arranging the sample onto the XPS sample holder may include a process of arranging a sample SP onto a voltage applying part 9. The sample SP may be an object to be analyzed by using the X-ray photoelectron spectroscopy method. The sample SP may have one portion disposed on a first electrode part 93. Thus, the sample SP may have the one portion electrically connected to the first electrode part 93. The sample SP may have another portion disposed on a second electrode part 95. Thus, the sample SP may have the another portion electrically connected to the second electrode part 95.

Figure 9:
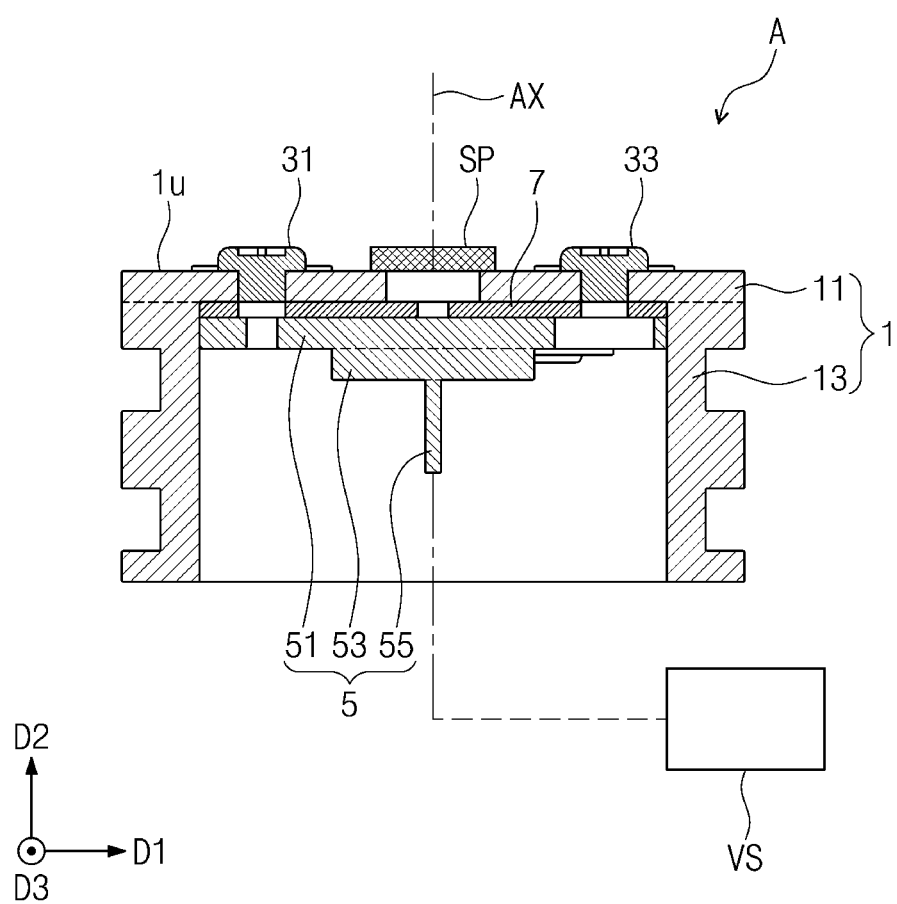
Figure 10:
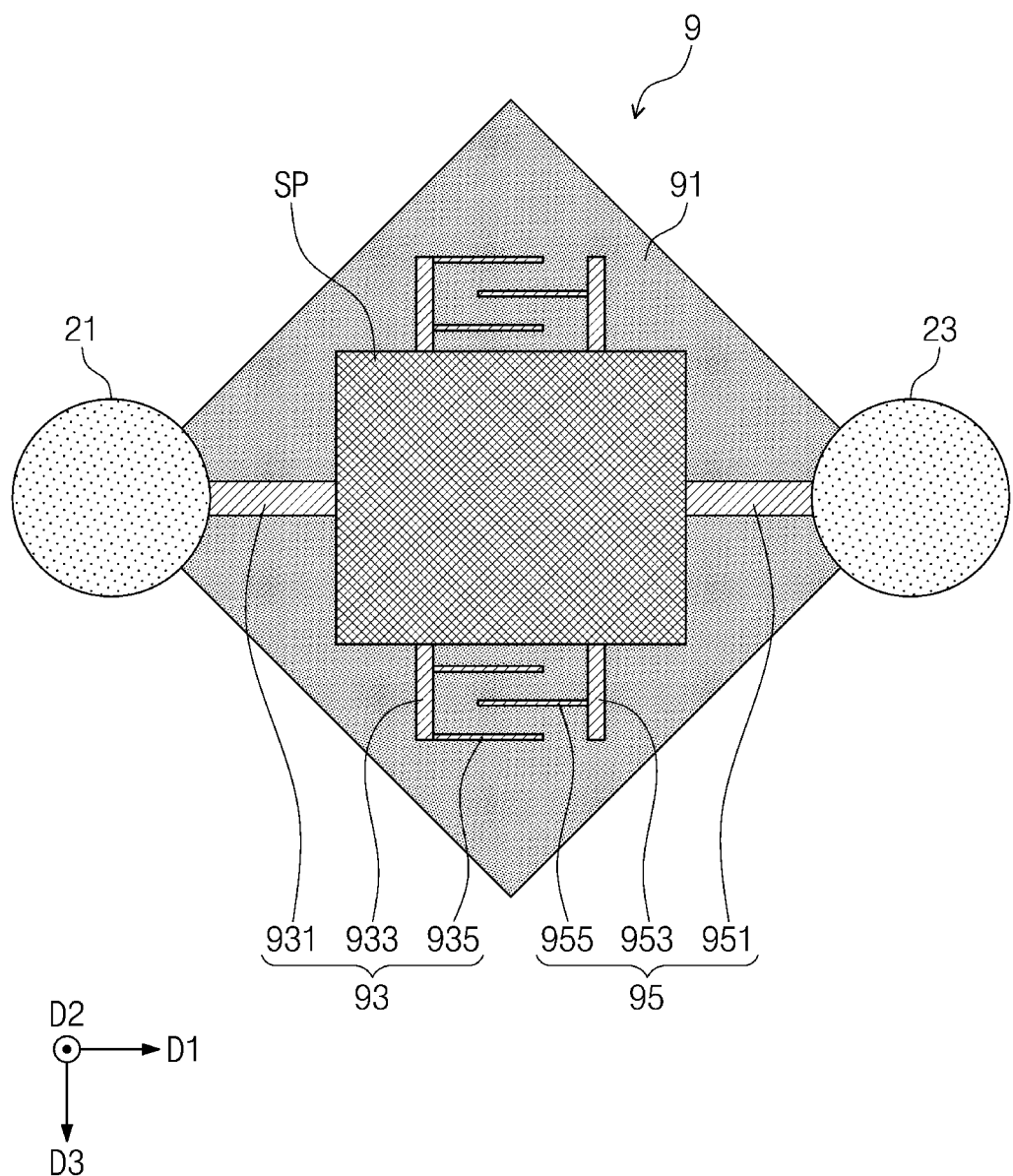

Referring to FIGS. 9, 10, and 7, the process S2 of applying a voltage to the sample may be performed by an XPS sample holder A. That is, the process S2 of applying a voltage to the sample may be performed by the first electrode part 93 and the second electrode part 95. More specifically, a voltage may be applied to one side of the sample SP from the voltage supply unit VS through an inner connection member 5, a first voltage transmitting member 31, and the first electrode part 93. Thus, the sample SP may be disposed under a voltage applied environment.

Figure 11:
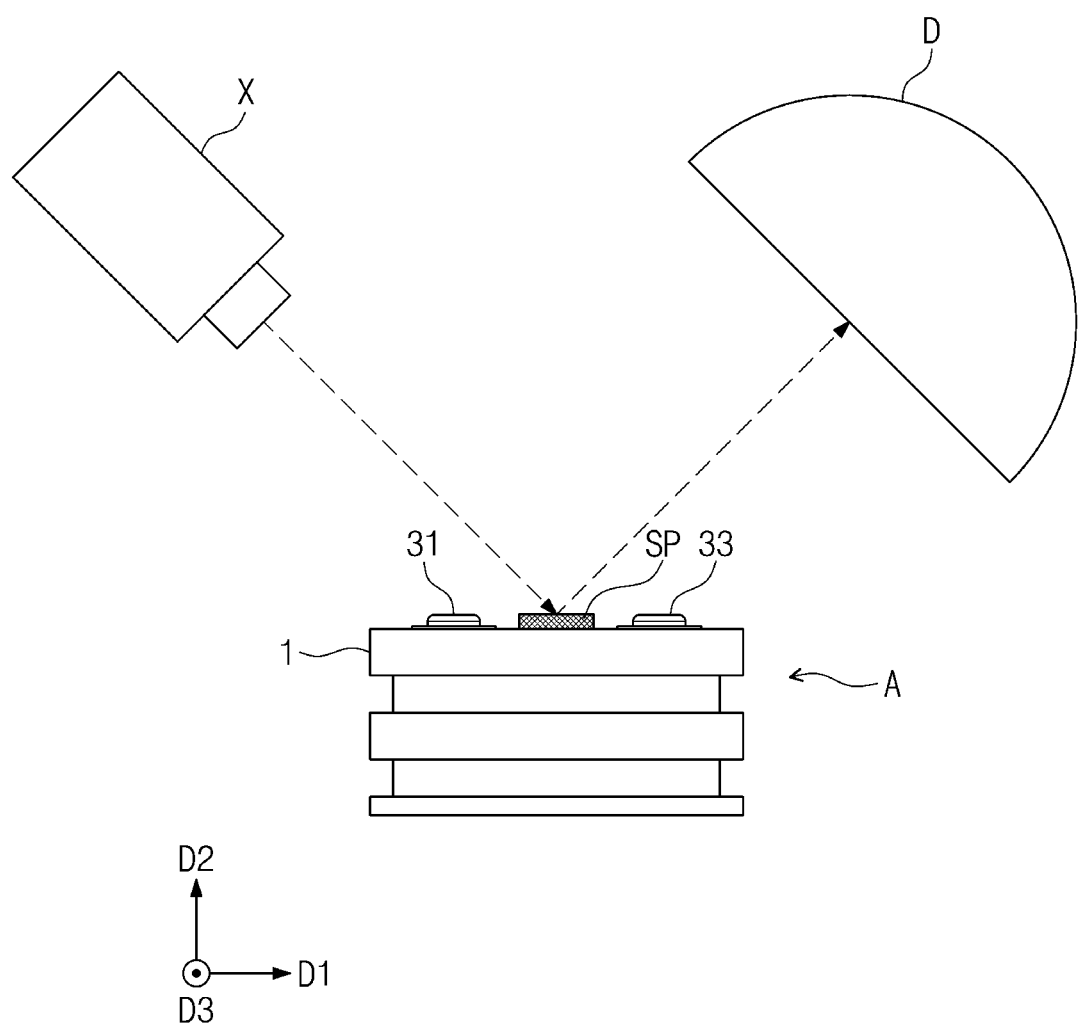

Referring to FIGS. 11 and 7, the process S3 of irradiating the sample with X-rays may include a process of irradiating the sample SP on the XPS sample holder A with X-rays L1. When the sample SP is irradiated with the X-rays L1, photoelectrons may be emitted from the sample SP by a photoelectric effect.

The process S4 of detecting photoelectrons may include a process of detecting photoelectrons L2 emitted from the sample SP by a detector D. That is, when the photoelectrons L2 are emitted from the sample SP by the X-rays L1, the detector D may detect the emitted photoelectrons L2. The detector D may perform analysis on the sample SP by using detected information.

According to the XPS sample holder, the X-ray photoelectron spectroscopy apparatus including the same, and the X-ray photoelectron spectroscopy method using the same, the sample may be analyzed under the voltage applied environment. That is, characteristics of the sample may be analyzed by using the XPS sample holder in a state in which a voltage is applied to the sample. Thus, when a voltage is applied, the sample may be real-time analyzed.

According to the XPS sample holder, the X-ray photoelectron spectroscopy apparatus including the same, and the X-ray photoelectron spectroscopy method using the same, a symmetric electric field may be provided. More specifically, since each of the holder body and/or the inner connection member has a symmetric shape, Also, since the electric field is blocked by the holder body, distortion of the electric field may be prevented from being generated at the outside of the holder body. Thus, distortion of measurement results caused by the electric field may be prevented. That is, even when a voltage is applied to the sample, exact measurement may be performed.

According to the XPS sample holder, the apparatus for X-ray photoelectron spectroscopy including the same, and the method for X-ray photoelectron spectroscopy using the same, the sample may be analyzed under the voltage applied environment.

According to the XPS sample holder, the apparatus for X-ray photoelectron spectroscopy including the same, and the method for X-ray photoelectron spectroscopy using the same, the distortion of the measurement results caused by the electric field may be prevented.

According to the XPS sample holder, the apparatus for X-ray photoelectron spectroscopy including the same, and the method for X-ray photoelectron spectroscopy using the same, the symmetric electric field may be provided.

The effects of the present invention are not limited to the aforementioned effects, but other objects not described herein will be clearly understood by those skilled in the art from descriptions below.

Although the embodiments of the present invention have been described, it is understood that the present invention should not be limited to these embodiments but various changes and modifications can be made by one ordinary skilled in the art within the spirit and scope of the present invention as hereinafter claimed. Thus, the above-disclosed embodiments are to be considered illustrative and not restrictive.

What is claimed is:

1. An X-ray photoelectron spectroscopy (XPS) sample holder comprising:
   a holder body configured to provide an inner space;
   a first voltage transmitting member that passes through a top surface of the holder body in a vertical direction;
   a second voltage transmitting member that passes through the top surface of the holder body in the vertical direction and is spaced apart from the first voltage transmitting member in a first direction that is a horizontal direction;
   an inner connection member disposed in the holder body and electrically connected to the first voltage transmitting member;
   a first electrode part disposed on the top surface of the holder body and connected to the first voltage transmitting member; and
   a second electrode part disposed on the top surface of the holder body and connected to the second voltage transmitting member,
   wherein the first electrode part and the second electrode part are spaced apart from each other in the first direction.

2. The XPS sample holder of claim 1, wherein the holder body is electrically grounded.

3. The XPS sample holder of claim 1, wherein the inner connection member passes an axis of the holder body parallel to a second direction that is a vertical direction and has a shape symmetric based on a cross-section parallel to the first direction.

4. The XPS sample holder of claim 3, wherein the inner connection member comprises:
   an inner connection plate spreading in the horizontal direction; and
   an inner connection axis extending downward from the inner connection plate,
   wherein the inner connection axis is disposed on the axis of the holder body, and
   the first voltage transmitting member is electrically connected to the inner connection plate.

5. The XPS sample holder of claim 1, further comprising an insulation plate disposed between the inner connection member and the holder body.

6. The XPS sample holder of claim 1, wherein the holder body comprises:
   an upper plate having the top surface; and
   a support member extending downward from the upper plate and surrounding the inner space at a side surface thereof.

7. The XPS sample holder of claim 1, wherein the first electrode part comprises:
   a first transmitting part having one end connected to the first voltage transmitting member and extending in the first direction;
   a first connection part extending from the other end of the first transmitting part in a horizontal direction crossing the first direction; and
   a plurality of first contact parts each extending from the first connection part in the first direction, and the second electrode part comprises:
   a second transmitting part having one end connected to the second voltage transmitting member and extending in the first direction;
   a second connection part extending from the other end of the second transmitting part in the horizontal direction crossing the first direction; and
   a plurality of second contact parts each extending from the second connection part in a direction opposite to the first direction,
   wherein each of the plurality of first contact parts is arranged alternately with each of the plurality of second contact parts in the horizontal direction.

8. The XPS sample holder of claim 1, wherein each of the first voltage transmitting member and the second voltage transmitting member has a screw shape.

9. An apparatus for X-ray photoelectron spectroscopy (XPS), comprising:
   an XPS sample holder; and
   an X-ray irradiation device configured to irradiate a sample on the XPS sample holder with X-rays,
   wherein the XPS sample holder comprises:
   a holder body;
   a first voltage transmitting member that passes through a top surface of the holder body in a vertical direction;
   a second voltage transmitting member that passes through the top surface of the holder body in the vertical direction and is spaced apart from the first voltage transmitting member;
   an inner connection member electrically connected to the first voltage transmitting member;
   a first electrode part disposed on the top surface of the holder body and connected to the first voltage transmitting member; and
   a second electrode part disposed on the top surface of the holder body and connected to the second voltage transmitting member,
   wherein the inner connection member comprises:
   an inner connection plate spreading in a horizontal direction; and
   an inner connection axis extending downward from the inner connection plate,
   wherein the inner connection axis is disposed on an axis of the holder body.

10. The apparatus of claim 9, wherein the second voltage transmitting member is electrically connected to the holder body, and
    the first voltage transmitting member is electrically connected to the inner connection plate.

11. The apparatus of claim 9, wherein the holder body comprises:
    an upper plate having the top surface; and
    a support member extending downward from the upper plate to define an inner space,
    wherein the inner connection member is disposed in the inner space.

12. The apparatus of claim 11, wherein the XPS sample holder further comprises an insulation plate disposed between the inner connection member and the holder body.

13. The apparatus of claim 12, wherein the insulation plate is disposed in the inner space.

14. The apparatus of claim 9, wherein each of the first voltage transmitting member and the second voltage transmitting member has a screw shape.

15. The apparatus of claim 9, further comprising a detector configured to detect photoelectrons emitted from the sample on the XPS sample holder.

16. A method for X-ray photoelectron spectroscopy (XPS), comprising:
- arranging a sample onto an XPS sample holder;
- applying a voltage to the sample by using the XPS sample holder; and
- irradiating the sample with X-rays,
- wherein the XPS sample holder comprises:
- a holder body;
- a first voltage transmitting member that passes through a top surface of the holder body in a vertical direction;
- a second voltage transmitting member that passes through the top surface of the holder body in the vertical direction and is spaced apart from the first voltage transmitting member;
- an inner connection member electrically connected to the first voltage transmitting member;
- a first electrode part disposed on the top surface of the holder body and connected to the first voltage transmitting member; and
- a second electrode part disposed on the top surface of the holder body and connected to the second voltage transmitting member,
- wherein the arranging of the sample onto the XPS sample holder comprises arranging the sample onto the first electrode part and the second electrode part.

17. The method of claim 16, wherein the applying of the voltage to the sample is performed by the first electrode part and the second electrode part.

18. The method of claim 16, wherein the second voltage transmitting member is electrically connected to the holder body.

19. The method of claim 16, wherein the inner connection member comprises:
- an inner connection plate spreading in a horizontal direction; and
- an inner connection axis extending downward from the inner connection plate,
- wherein the inner connection axis is disposed on an axis of the holder body.

20. The method of claim 16, further comprising detecting photoelectrons emitted from the sample on the XPS sample holder.

* * * * *